US008430614B2

(12) United States Patent
Ito et al.

(10) Patent No.: US 8,430,614 B2
(45) Date of Patent: Apr. 30, 2013

(54) POST-INSTALLED ANCHOR

(75) Inventors: Toshiharu Ito, Tsushima (JP); Seiji Hijikata, Tsushima (JP)

(73) Assignee: Kabushikikaisha Taisei Kougyou, Aichi (JP)

( * ) Notice: Subject to any disclaimer, the term of this patent is extended or adjusted under 35 U.S.C. 154(b) by 303 days.

(21) Appl. No.: 12/937,736

(22) PCT Filed: Apr. 18, 2008

(86) PCT No.: PCT/JP2008/058006
§ 371 (c)(1),
(2), (4) Date: Oct. 14, 2010

(87) PCT Pub. No.: WO2009/128171
PCT Pub. Date: Oct. 22, 2009

(65) Prior Publication Data
US 2011/0038683 A1     Feb. 17, 2011

(51) Int. Cl.
*F16B 13/06*     (2006.01)
(52) U.S. Cl.
USPC ............................... 411/54; 411/57.1; 411/72
(58) Field of Classification Search ................ 411/54, 411/55, 57.1, 69–72
See application file for complete search history.

(56) References Cited

U.S. PATENT DOCUMENTS

| | | | |
|---|---|---|---|
| 445,332 A * | 1/1891 | Phillips | 411/54 |
| 626,040 A | 5/1899 | Rowland | |
| 703,796 A * | 7/1902 | Lakhovsky | 411/54 |
| 1,031,462 A * | 7/1912 | Paine | 411/60.1 |

(Continued)

FOREIGN PATENT DOCUMENTS

| | | |
|---|---|---|
| CH | 569157 A5 | 11/1975 |
| DE | 2754910 A1 | 6/1979 |

(Continued)

OTHER PUBLICATIONS

EPO Examination Report, dated Jul. 19 of Patent Appl No. 08740850.6, filing date Apr. 18, 2008, 4 pages.

(Continued)

*Primary Examiner* — Flemming Saether
(74) *Attorney, Agent, or Firm* — Maine Cernota & Rardin

(57) ABSTRACT

The present invention relates to an anchor bolt and more specifically pertains to a post-installed anchor that is securely anchored to, for example, an existing concrete floor. The post-installed anchor has a sleeve fit on a bolt body and a fixation member arranged on an edge of the bolt body and screwed to a threaded end of the bolt body. The fixation member has an internal threaded end and an expansion end. The expansion end is divided into four expansion pieces by slits. The expansion pieces are arranged to face a head of the bolt body and are slightly widened toward the head of the bolt body. One end of the sleeve forms a tapered face. After insertion of the post-installed anchor into a pilot hole (installation hole) bored in the concrete floor, as the bolt body rotates, the fixation member screwed to the bolt body moves toward the sleeve. This movement causes the expansion end of the fixation member to ride on the tapered face of the sleeve and to be pressed open and extended outward. The expansion pieces of the expansion end are then buckled and bite into an inner circumferential face of the installation hole, so that the post-installed anchor is securely fixed to the installation hole.

14 Claims, 9 Drawing Sheets

U.S. PATENT DOCUMENTS

| | | | | |
|---|---|---|---|---|
| 3,874,264 | A | * | 4/1975 | Polos ........................... 411/80.6 |
| 4,293,259 | A | * | 10/1981 | Liebig ............................. 411/32 |
| 4,408,937 | A | * | 10/1983 | Hainke et al. ................... 411/42 |
| 4,690,597 | A | | 9/1987 | Liebig |
| 5,256,016 | A | | 10/1993 | Godfrey |

FOREIGN PATENT DOCUMENTS

| | | | |
|---|---|---|---|
| JP | 54104607 | A | 8/1979 |
| JP | 61022910 | U | 2/1986 |
| JP | 61123107 | U | 8/1986 |
| JP | 1-143810 | U | 10/1989 |
| JP | 04111909 | U | 9/1992 |
| JP | 5272518 | A | 10/1993 |
| JP | 10159822 | A | 6/1998 |
| JP | 2003027599 | A | 1/2003 |

OTHER PUBLICATIONS

PCT Search Report dated May 20, 2008 of Patent Application No. PCT/JP2008/058006 filed Apr. 18, 2008.

Supplemental European Search Report dated Oct. 7, 2011 of Patent Application No. 08740850.6 filed Apr. 18, 2008.

* cited by examiner

POST-INSTALLED ANCHOR

RELATED APPLICATIONS

This application is a national phase application filed under 35 USC §371 of PCT Application No. PCT/JP2008/058006 with an International filing date of Apr. 18, 2008, and is herein incorporated by reference in it's entirety for all purposes.

TECHNICAL FIELD

The present invention relates to an anchor bolt and more specifically pertains to a post-installed anchor that is securely anchored to an existing floor surface or an existing wall surface made of, for example, concrete.

BACKGROUND ART

Anchor bolts are generally embedded in concrete for the purpose of fixation of a structural member (timber or steel) or equipment. There is another type of anchor bolt that is attached to an existing concrete floor. This type of anchor bolt used for fixation after construction is called 'after application anchor bolt' or 'post-installed anchor'.

For attachment of the post-installed anchor in the existing concrete floor, a pilot hole of a predetermined depth is opened, and the post-installed anchor is inserted into and fixed to the pilot hole. There are two different types of fixation, chemical-type fixation and sleeve-type fixation. The chemical-type fixation fills the pilot hole with an adhesive and drives the anchor into the adhesive-filled pilot hole.

The sleeve-type fixation makes an insertion end of the anchor tapered to gradually increase the diameter toward an edge and inserts the anchor covered with a fixation sleeve into a pilot hole, which is formed to have a diameter substantially equal to the outer diameter of the sleeve. The sleeve-type fixation then drives the fixation sleeve in the pilot hole with a drive-in sleeve having the same diameter as that of the fixation sleeve. The driven-in fixation sleeve moves toward the edge of the anchor and is extended outward along the tapered insertion end of the anchor to bite into the inner wall of the pilot hole.

Another type of the post-installed anchor is fixed by rotation, instead of driving in the fixation sleeve. This is equivalent to formation of the tapered insertion end of the drive-in-type anchor as a nut. Rotation of the anchor moves a nut, which is temporarily tightened to the insertion end of the anchor, to enter deep inside the fixation sleeve. The fixation sleeve then rides on the tapered face of the nut to be widened or extended outward. The fixation sleeve is thus strongly pressed against and adheres to the concrete surface, so that the post-installed anchor is securely fixed to the pilot hole.

SUMMARY

Anchor bolts are generally used to securely fix equipment or structures. Post-installed anchors may have only insufficient anchoring strength, due to the characteristic of post construction. In the drive-in-type post-installed anchor, the fixation sleeve is widened or extended outward by the drive-in force to generate a tensile strength and adhere to the inner wall of the pilot hole formed in the concrete floor. The post-installed anchor may thus be slipped off under application of a larger tensile force than the drive-in force. This phenomenon is not characteristic of the drive-in-type anchor but is also found in the post-installed anchor with the nut having the tapered end.

By taking into account the issue discussed above, there is a requirement for providing a post-installed anchor that allows for quick and secure fixation of an object structure by a simple operation and has a high tensile strength.

According to one aspect of the invention, there is provided a post-installed anchor driven in a pilot hole to be securely fixed. The post-driven anchor includes a bolt body structured to have a threaded end, a fixation member structured to have a threaded end screwed to the threaded end of the bolt body and an expansion end on a side facing a head of the bolt body, and a large-diameter member formed to have a larger diameter than the bolt body and structured to allow the expansion end of the fixation member to ride on one end of the large-diameter member with a movement of the fixation member toward the head of the bolt body, which is induced by rotation of the bolt body. The expansion end of the fixation member riding on the large-diameter member is widened and extended outward, so that the expansion end is press fit in the pilot hole and the post-installed anchor bolt is fixed to the pilot hole.

In the post-installed anchor according to this aspect of the invention, with rotation of the bolt body, the fixation member screwed to the bolt body moves toward the head of the bolt body. This movement of the fixation member causes the expansion end of the fixation member to ride on the large-diameter member and thereby widens or extends outward the expansion end. The widened expansion end is strongly pressed against the inner wall of the pilot hole and moves toward the head of the bolt body simultaneously with the outward extension. The edge of the expansion end is accordingly press fit in and bites into the inner wall of the pilot hole, so as to securely fix the whole post-installed anchor.

According to one embodiment of the post-installed anchor, an end of the large-diameter member in proximity to the fixation member forms a tapered face. The tapered structure facilitates the ride of the expansion end onto the large-diameter member and smoothly widens or extends outward the expansion end. The edge of the large-diameter member may be formed to a non-tapered face or a reverse-tapered face, as along as the expansion end can ride on the large-diameter member. The large-diameter member may be a sleeve fit on the bolt body. Alternatively the whole length of a shank of the bolt body or one end of the bolt body in proximity to the threaded end may be designed to have a larger diameter.

The sleeve may not be formed as an integral structure but may consist of at least two sleeve members separated in an axial direction. One sleeve member arranged in proximity to the fixation member has a tapered face with an outer diameter gradually narrowed in a direction toward the fixation member. Combining one tapered sleeve member with sleeve members of different lengths and bolt bodies of different lengths enables various types and dimensions of post-installed anchors to be readily produced.

According to one embodiment of the post-installed anchor, the fixation member has at least four cuts, and the expansion end is divided into multiple expansion pieces by the at least four cuts to have a shape widened toward an edge of the expansion end. The post-installed anchor of this embodiment has the expansion end divided into four or a greater number of expansion pieces, thus facilitating the expansion.

According to one embodiment of the post-installed anchor, at least one of the multiple expansion pieces of the expansion end divided by the at least four cuts is formed in a shape that prevents an edge of the sleeve in proximity to the fixation member from entering deep inside the expansion end in the course of inserting the post-installed anchor into the pilot hole. This arrangement effectively prevents the sleeve from being stuck in the expansion end in the course of insertion of the post-installed anchor into the pilot hole and from interfering with further insertion of the post-installed anchor.

According to one embodiment of the post-installed anchor, the expansion end of the fixation member has a longer length in an axial direction than a length of the threaded end of the fixation member screwed to the threaded end of the bolt body. This arrangement has the sufficient length of the expansion end and allows for deformation of the expansion end accompanied induced by the rotation of the bolt body and the sufficient bite of the expansion end into the inner wall of the pilot hole.

According to another aspect of the invention, there is provided a post-installed anchor driven in a pilot hole to be securely fixed and structured by a simple combination of a bolt body, a sleeve, and a fixation member. At least two bolt bodies of different lengths and at least two sleeves of different lengths are provided. Assembling one selected bolt body and one or multiple selected sleeves readily gives a post-installed anchor having a different whole length. In the post-installed anchor according to this aspect of the invention, a fixation member is structured to have a threaded end screwed to a threaded end of the bolt body with the sleeve fit thereon and an expansion end arranged in proximity to the sleeve. With a movement of the fixation member toward a head of the bolt body, which is induced by rotation of the bolt body, an edge of the sleeve presses open and extends outward the expansion end of the fixation member. The post-installed anchor of this arrangement has the sufficient anchoring strength.

BEST MODES OF CARRYING OUT THE INVENTION

Figure 1:
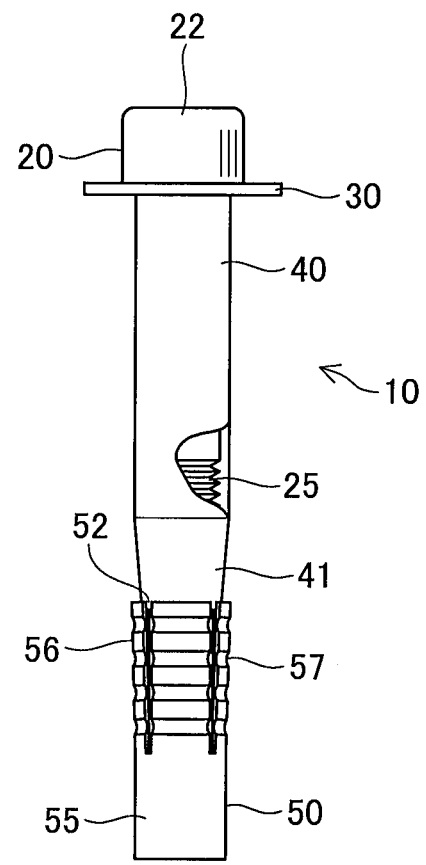
FIG. 1 is a front view diagrammatic representation of a post-installed anchor according to a first embodiment in an assembled state.
Figure 2:
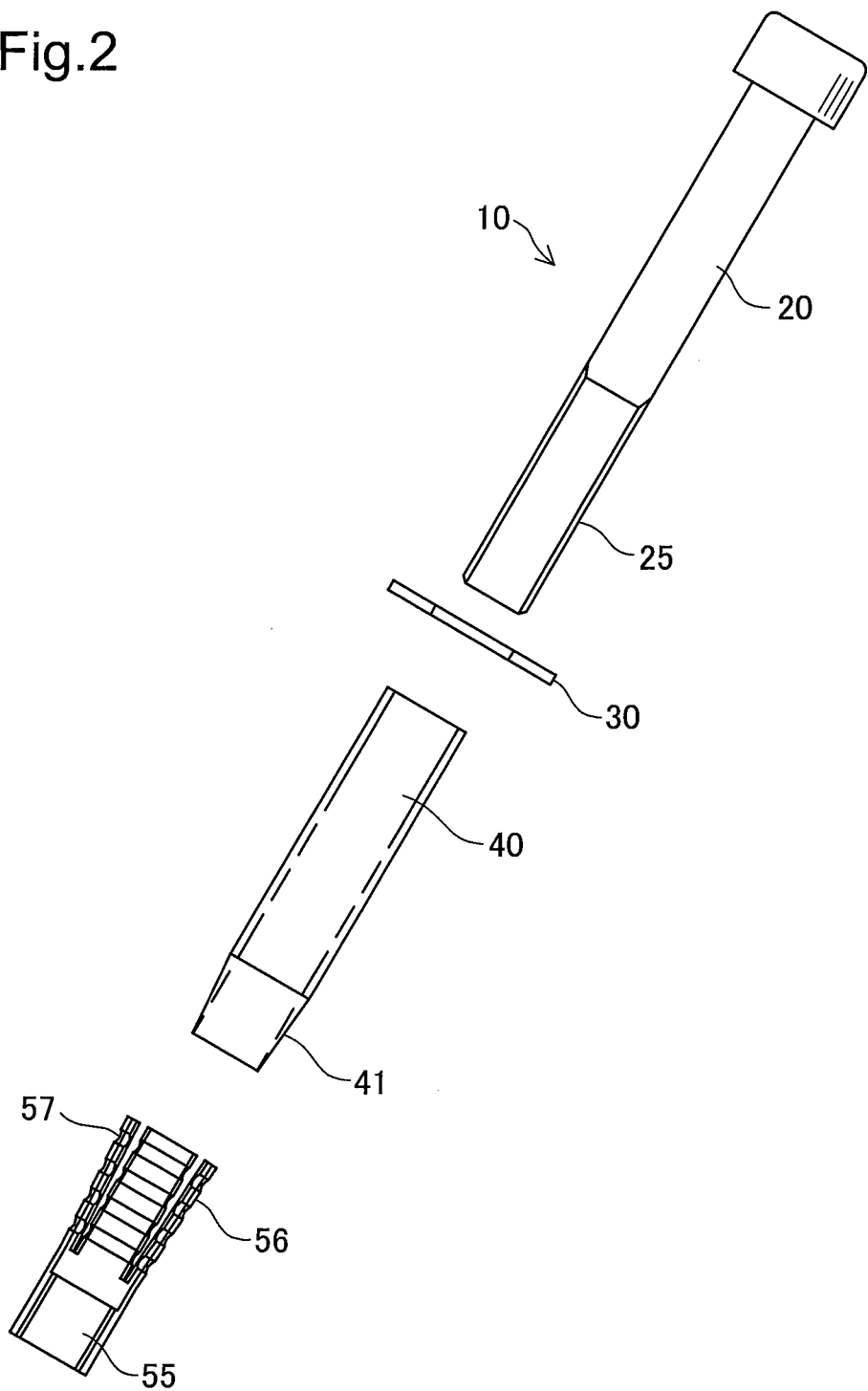
FIG. 2 is an exploded diagrammatic representation of the post-installed anchor of the first embodiment.

One embodiment of the invention is described below. FIG. 1 is an explanatory diagrammatic representation of the structure of a post-installed anchor 10 according to a first embodiment of the invention. The post-installed anchor 10 is shown in an assembled state in FIG. 1. FIG. 2 is an explanatory diagrammatic representation of the post-installed anchor 10 in a disassembled state.

As shown in FIGS. 1 and 2, the post-installed anchor 10 of the first embodiment includes a bolt body 20, a washer 30 attached first to the bolt body 20, a sleeve 40 having a tapered face on one end, and a fixation member 50 screwed to the bolt body 20. An assembling procedure sequentially attaches the washer 30 to the bolt body 20, fits the sleeve 40 on the bolt body 20 with a tapered face 41 located in proximity to one end of the bolt body 20, and screws an internal threaded end 55 of the fixation member 50 to an external threaded end 24 of the bolt body 20 in such a manner as to locate an expansion end 56 in proximity to the sleeve 40. The post-installed anchor 10 is thereby assembled to the state of FIG. 1.

The bolt body 20 is a hexagon socket head cap screw in the first embodiment, but may be a hexagon head bolt. The bolt body 20 has the external threaded end 25 formed at one end. The substantially whole length of the bolt body 20 may be fully threaded to form a male thread. The bolt body 20 of the first embodiment has a diameter of 16 mm and a male thread nominal diameter of M16. The nominal diameter of the bolt body 20 is, however, not restricted to this embodiment but may be any of various values, for example, M20, M22, and M24. The bolt body 20 is made of any of various metals conventionally used for bolts and screws, for example, stainless steel, iron, iron alloy, or brass. The post-installed anchor 10 often has outdoor applications and may thus be plated with a metal having high corrosion resistance, for example, chrome-plated, as anticorrosive coating. The surface of the post-installed anchor 10 may be subject to bright chromate treatment (Unichrome). As long as the strength requirement is satisfied, part or all of the respective components of the pos-installed anchor including the bolt body, the washer, the sleeve, and the fixation member may be made of a non-metal material like a synthetic resin (e.g., polycarbonate or ABS) or a natural material (e.g., lumber or stone).

The structure of the fixation member 50 is explained in detail. The fixation member 50 has the internal threaded end 55 and the expansion end 56 as mentioned above. The expansion end 56 has cuts 52 at substantially quartered positions around its circumference. Namely the cuts 52 divide the expansion end 56 into four pieces (hereafter may be referred to as 'expansion pieces' according to the requirements). The respective expansion pieces are slightly expanded toward their end edges. The fixation member 50 is screwed to the mail threaded end 25 of the bolt body 20, so that the post-installed anchor 10 is assembled. In this assembled state, rotation of the fixation member 50 with an anti-rotation mechanism moves the fixation member 56 toward a head 22 of the bolt body 20 and causes one end of the tapered face 41 of the sleeve 40 to slightly enter inside the expansion pieces of the expansion end 56.

Each of the expansion pieces of the expansion end 56 has multiple shallow concavities 57 formed at preset intervals on its outer circumferential face as shown in FIGS. 1 and 2. The concavities 57 are formed, in order to induce buckling in the course of fixation of the post-installed anchor 10 to a pilot hole (installation hole 90) as described later. The sleeve 40 and the fixation member 50 are manufactured by pressing in this embodiment, but may be manufactured by any of various processing techniques other than pressing, for example, cutting, precision forging, or die casting. In one modification of the fixation member, the internal threaded end 55 may be provided separately in the form of a nut and welded to or otherwise joined with the expansion end 56. As long as the nut is designed to have an anti-rotation mechanism that works in the installation hole 90, the nut may be separated from the expansion end.

Figure 3A:
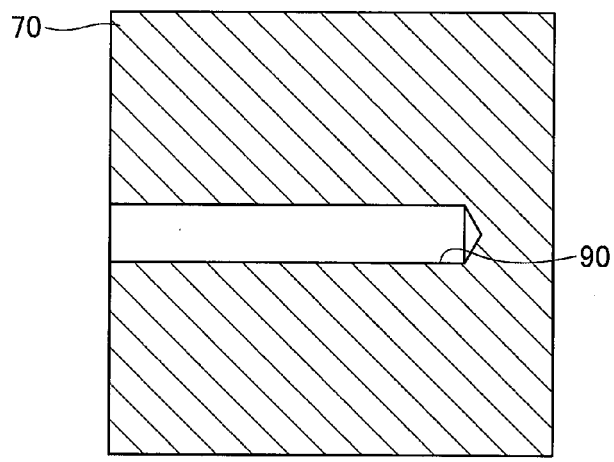
FIGS. 3A through 3C are diagrammatic representations of an attachment procedure of the post-installed anchor of the first embodiment.
Figure 3B:
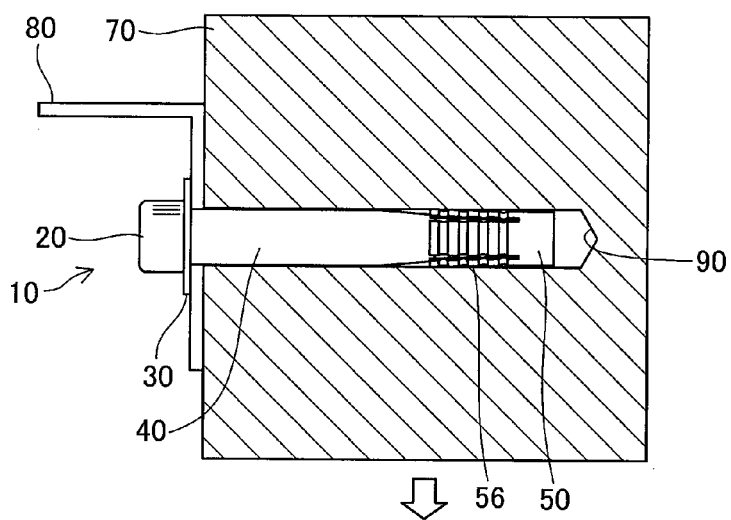
Figure 3C:
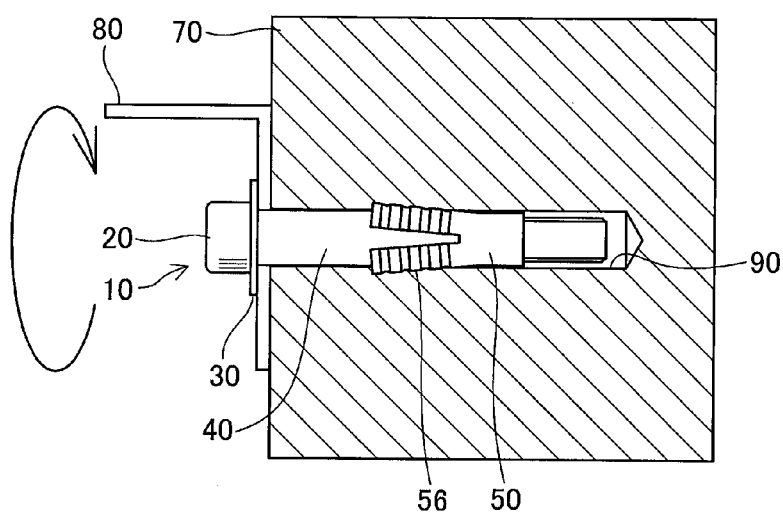

A procedure of using the post-installed anchor 10 after the assembly is described with reference to FIGS. 3A through 3C. For the purpose of fixation of the post-installed anchor 10, the procedure bores a structure as a fixation base, for example, a concrete floor surface 70, with a drill to form an installation hole 90 as shown in FIG. 3A. The installation hole 90 has an inner diameter that is slightly smaller than an outer diameter of the post-installed anchor 10 or more specifically an outer diameter of the expansion end 56 of the fixation member 50.

After formation of the installation hole 90, the procedure cleans the installation hole 90 with a dust pump or a suction machine to blow off and remove the dust. The procedure inserts the post-installed anchor 10 in the assembled state of FIG. 1 into the cleaned installation hole 90. The outer diameter of the expansion end 56 of the post-installed anchor 10 is slightly greater than the inner diameter of the installation hole 90. As the post-installed anchor 10 is inserted into the installation hole 90 and the edge of the expansion end 56 reaches the installation hole 90, further insertion of the post-installed anchor 10 requires a force of compressing the expansion end 56. This state is shown in FIG. 3B. The post-installed anchor 10 is used to fix a certain member. As the post-installed anchor 10 is inserted into the installation hole 90, a member 80 as a fixation object to be fixed is attached together with the post-installed anchor 10.

Figure 4:
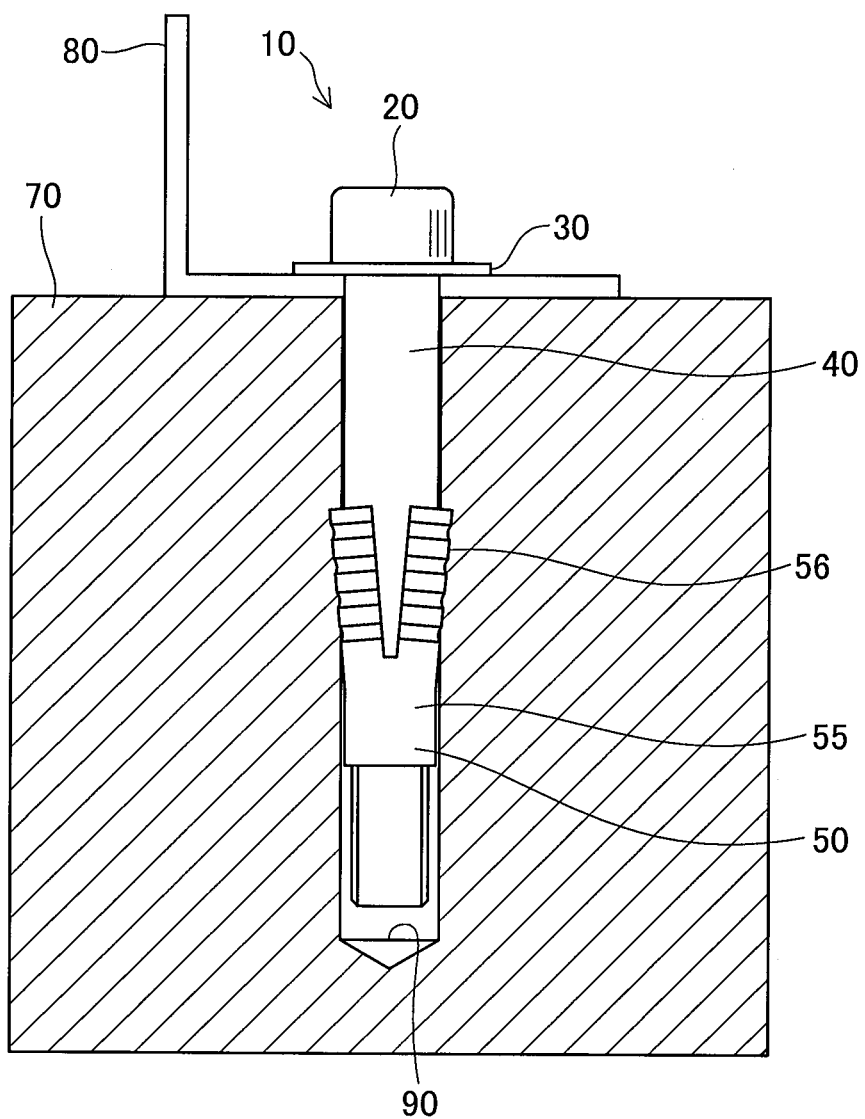
FIG. 4 is a sectional view diagrammatic representation of attachment of the post-installed anchor of the first embodiment.

After insertion of the post-installed anchor 10 into the installation hole 90, the procedure places a hexagon wrench in a hexagon socket head formed in the head 22 of the bolt body 20 and tightens the bolt body 20. The fixation member 50 screwed to the external threaded end 25 of the bolt body 20 is fit in the inner circumference of the installation hole 90 to be not rotated. The fixation member 50 accordingly moves toward the head 22 of the bolt body 20. The expansion end 56 of the fixation member 50 comes into contact with and rides on the tapered face 41 of the sleeve 40 with the movement of the fixation member 50, so that the edge of the expansion end 50 is widened outward. The inner diameter of the installation hole 90 is not significantly different from the outer diameter of the expansion end 56. As shown in FIG. 3C, the expansion end 56 riding on the tapered face 41 to be widened outward is buckled in proximity to the concavities 57, and the edge of the expansion end 56 is press fit in and bites into the inner circumferential face of the installation hole 90. The post-installed anchor 10 is thus securely fixed to the installation hole 90. This state is shown in FIG. 4.

Figure 5:
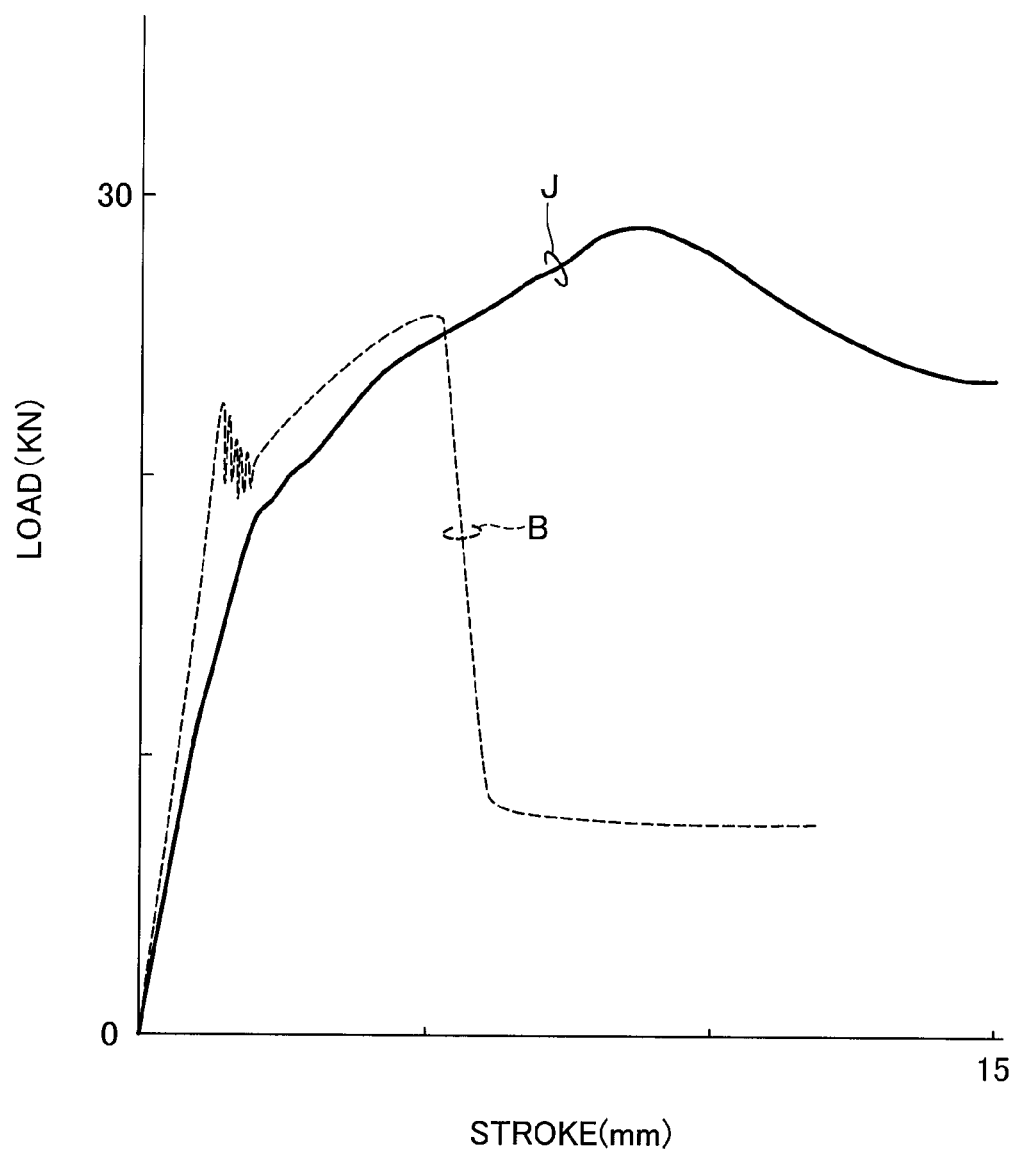
FIG. 5 is a graphical representation of variations of attachment strength of the post-installed anchor of the first embodiment and a conventional post-installed anchor.

The tensile strength of the post-installed anchor 10 after the fixation was measured. The tensile strength of the post-installed anchor 10 was significantly higher than the tensile strength of a conventional post-installed anchor. FIG. 5 is a graphical representation of tensile strength curves of the post-installed anchor 10 of the embodiment and a conventional post-installed anchor. The conventional post-installed anchor used was a mechanical anchor. A solid line curve J shows a variation of tensile load against displacement (stroke) of the post-installed anchor 10 of the embodiment drawn in a pull-out direction. A broken line curve B shows a variation of tensile load against displacement (stroke) of the conventional post-installed anchor in the pull-out direction.

As clearly understood from this graphical representation, the conventional post-installed anchor had an abrupt and significant decrease in tensile strength by a stroke of about 6 millimeters. This means that the conventional post-installed anchor is about to fall off the installation hole 90. The post-installed anchor 10 of the embodiment, on the other hand, had no substantial decrease in tensile strength by displacement in the pull-out direction under application of a load in the pull-out direction. According to the experimental result, the post-installed anchor 10 of the embodiment had a gradual increase in tensile strength up to a stroke of about 10 millimeters and still kept a high level of tensile strength even at a stroke of about 3 times as large as the fall-off stroke of the conventional post-installed anchor. In the post-installed anchor 10 of the embodiment, the edge of the expansion end 56 on a side facing the head 22 of the bolt body 20 is widened outward. As the bolt body 20 is tightened to move the fixation member 50, the expansion end 56 is buckled and bites into the inner wall of the installation hole 90 for fixation. Application of a force in the pull-out direction on the post-installed anchor 10 causes the expansion end 56 to further bite into concrete and assures the higher tensile strength.

As described above, the post-installed anchor 10 of the embodiment is inserted into the drill-bored installation hole 90 and is securely fixed in the installation hole 90 by simple rotation of the bolt body 20. This arrangement does not require any special labor of driving in the post-installed anchor or any special tool or adhesive but allows anyone to secure and anchor equipment with post-installed anchors. This arrangement also reduces the time and labor required for embedding the post-installed anchors and significantly enhances the working efficiency.

The attachment and fixation of the post-installed anchor 10 of the embodiment is attainable by only rotating and tightening the head 22 of the bolt body 20 and does not require any troublesome work of driving in the sleeve 40 with an identical-diameter driving sleeve. The attachment work does not have an impact on the installation hole 90 and protects the concrete base from potential cracking. The post-installed anchor 10 of the embodiment is thus applicable to relatively brittle material, such as foamed concrete and has wide variety of applications. The non-use of the driving sleeve enhances the degree of freedom in head and overall shapes of the post-installed anchor. The post-installed anchor is not restricted to the hexagon socket head cap screw of this embodiment but may be formed in any of various shapes corresponding to the applications, for example, a hexagon head bolt.

Figure 6:
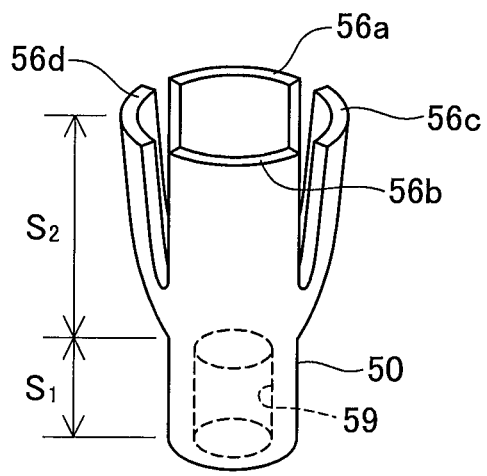
FIG. 6 is a perspective view diagrammatic representation of the shape of a fixation member in one modification.
Figure 7:
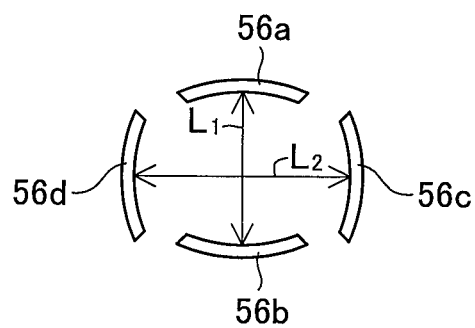
FIG. 7 is an explanatory diagrammatic representation of inner diameters (longer diameter and shorter diameter) of the fixation member in the modification.

One modification of the invention is described below. In the structure of the first embodiment, the expansion end 56 of the fixation member 50 is divided by the slits 52 into the four equal parts, which are substantially concentric and are slightly widened at their edges. The expansion end 56 may be slightly flattened in one direction as shown in FIGS. 6 and 7.

Figure 8:
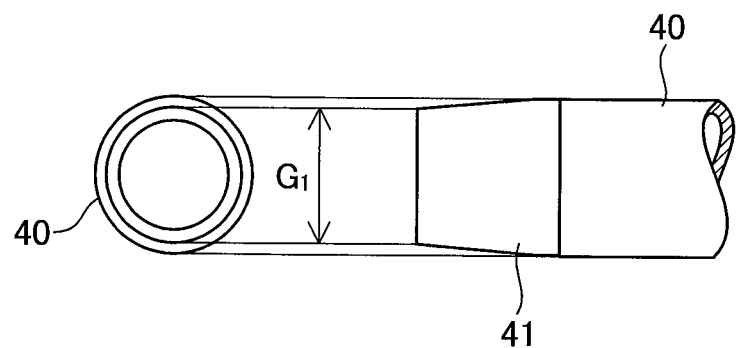
FIG. 8 is an explanatory diagrammatic representation of a dimension of a sleeve 40 in the modification.

In a post-installed anchor of this modification, an expansion end 56 is divided into four pieces (expansion pieces) 56a through 56d, where one set of two opposed expansion pieces 56a and 56b have a slightly broader width than that of the other set of two opposed expansion pieces 56c and 56d. An inner diameter L1 between the opposed broader expansion pieces 56a and 56b is narrower than an inner diameter L2 between the opposed narrower expansion pieces 56c and 56d as shown in FIG. 7. An outer diameter G1 of an edge (FIG. 8) of a tapered face 41 of a sleeve 40 that is in contact with the expansion pieces 56a through 56d is equal to or slightly smaller than the inner diameter L1 between the opposed broader expansion pieces 56a and 56b. When the post-installed anchor of the modification is assembled to the assembled state of FIG. 1, the expansion pieces 56a and 56b comes into contact with and is engaged with the edge of the tapered face 41 of the sleeve 40. The expansion pieces 56c and 56d arranged across the larger inner diameter L2 do not come into contact with the tapered face 41 and are deformable by an external force.

As the post-installed anchor of the modification is driven into the installation hole 90, this arrangement prevents the edge of the tapered face 41 of the sleeve 40 from entering deep inside the expansion pieces 56a through 56d and interfering with deformation of the expansion pieces 56c and 56d. When the inner diameter of the installation hole 90 is set to be substantially equal to an outer diameter between the opposed expansion pieces 56a and 56b, the expansion pieces 56c and 56d arranged across a wider outer diameter are hit against the inner wall of the installation hole 90 to be deformed in the course of driving in the post-installed anchor into the installation hole 90. The post-installed anchor can thus be driven with an adequate level of resistance in the installation hole 90. In the state of the post-installed anchor driven in the installation hole 90, as the bolt body 20 is rotated, the expansion pieces 56c and 56d are stuck by the inner circumference of the installation hole 90 and thereby function as the anti-rotation mechanism. With rotation of the bolt body 20, the fixation member 50 starts moving toward the head 22.

In the structure of this modification, an axial length S2 of the expansion pieces 56a through 56d is longer than an axial length S1 of an external threaded end 55 with an external thread 59. The expansion pieces 56c and 56d accordingly allow for a sufficient amount of deformation.

Figure 9A:
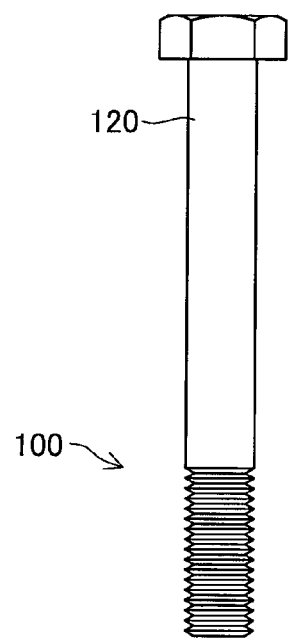
FIGS. 9A and 9B are explanatory diagrammatic representations of a post-installed anchor 100 according to a second embodiment and a post-installed anchor 110 in one modification of the second embodiment.
Figure 9A:
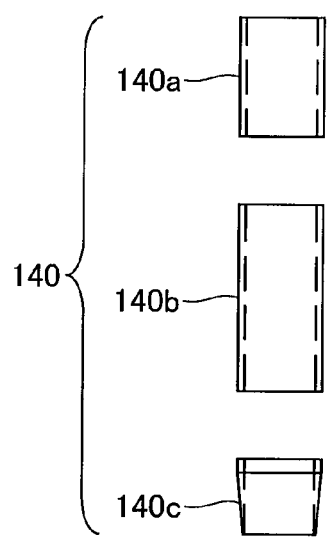
Figure 9A:
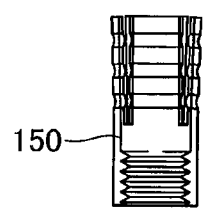
Figure 9B:
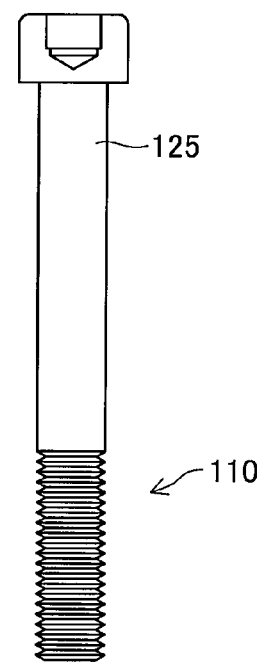
Figure 9B:
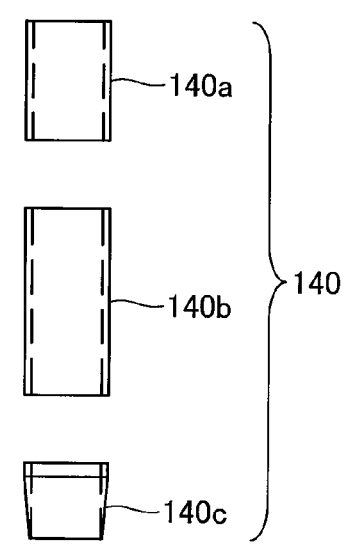
Figure 9B:
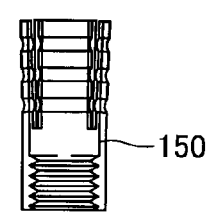

A second embodiment according to the invention is described below. FIG. 9A is an explanatory diagrammatic representation of a post-installed anchor 100 according to the second embodiment in a disassembled state. FIG. 9B is an explanatory diagrammatic representation of one modification of the second embodiment. The post-installed anchor 100 shown in FIG. 9A is assembled by sequentially attaching a washer 130 and a three-part sleeve 140 to a bolt body 120 and screwing a fixation member 150 to a threaded end of the bolt body 120.

The sleeve 140 of the second embodiment has a shorter first sleeve member 140a, a longer second sleeve member 140b that is longer than the first sleeve member 140a, and a tapered member 140c. These three members have an identical inner diameter, so that the sleeve 140 attached to the bolt body 120 has similar functions to those of the sleeve of the first embodiment. In the modification of FIG. 9B, a post-installed anchor 110 is constructed as a hexagon socket head cap screw. The post-installed anchor of the modification shown in FIG. 9B has the same structure as that of the post-installed anchor of the second embodiment shown in FIG. 9A, except the shape of the head.

Figure 10A:
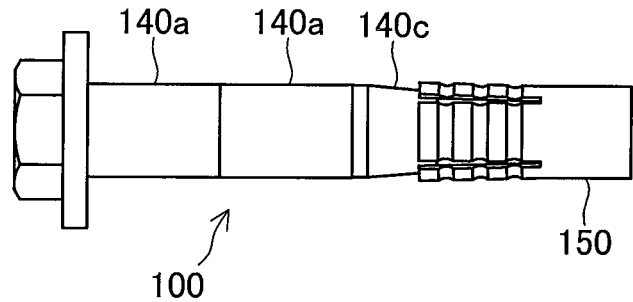
FIGS. 10A through 10C are explanatory diagrammatic representations of post-installed anchors as modifications of the second embodiment.
Figure 10B:
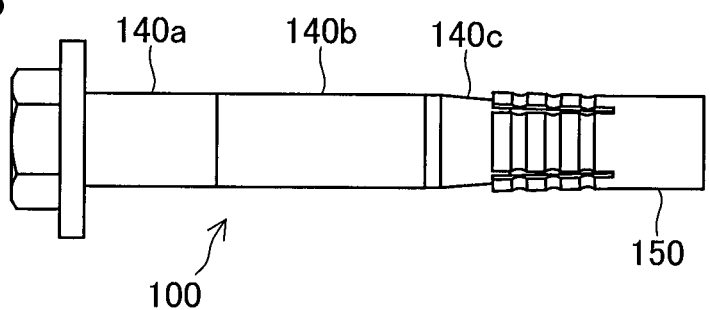
Figure 10C:
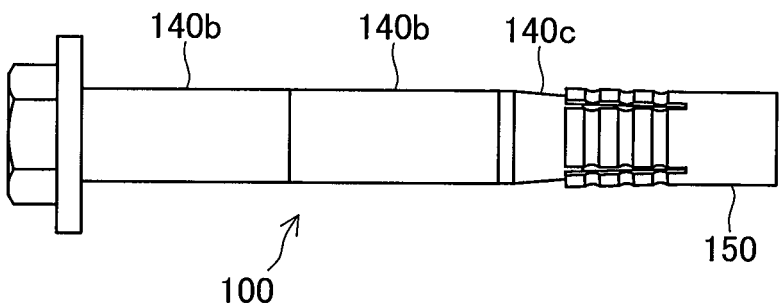

In the post-installed anchor 100 or 110 of the second embodiment, the sleeve 140 consists of multiple members. Combining sleeves of different lengths readily gives post-installed anchors 100 or 110 of various lengths. Typical examples include a combination of two shorter sleeves 140a (FIG. 10A), a combination of first and second sleeves 140a and 140b of different lengths (FIG. 10B), and a combination of two longer sleeves 140b (FIG. 10C). Providing only two types of sleeves having different lengths (140a and 140b) enables the manufacturer to produce five different lengths of post-installed anchors 100 (110) including those with only one shorter sleeve and with only one longer sleeve. In another application, only one type of sleeve having a shorter length may be provided, and varying the number of sleeves may give different lengths of post-installed anchors.

The post-installed anchor 100 (110) of the second embodiment has the sufficiently high tensile strength by the simple attachment, like the first embodiment. The fixation member 150 structured similarly to the fixation member in the modification of the first embodiment shown in FIGS. 6 through 8 has the similar effects to those of the first embodiment.

Figure 11:
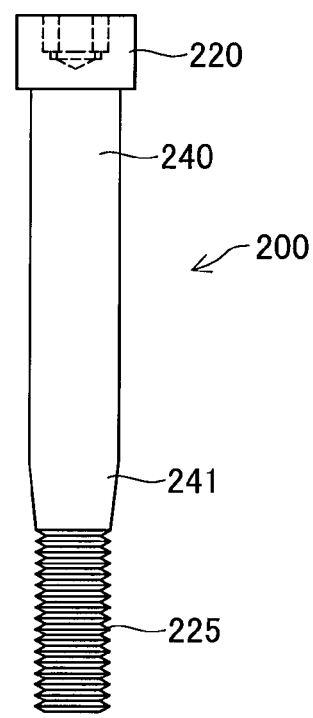
FIG. 11 is an explanatory diagrammatic representation of the structure of a post-installed anchor 200 according to a third embodiment.
Figure 11:
Figure 11:
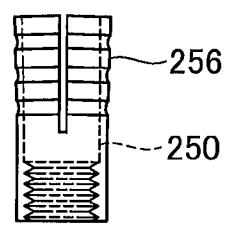

A third embodiment according to the invention is described below. As shown in FIG. 11, in a post-installed anchor 200 according to the third embodiment, a shank member 240 of a bolt body 220 is structured to have a similar outer shape to that of the sleeve 40 of the first embodiment and works as a large-diameter member which an expansion edge 256 of a fixation member 250 rides on. Like the sleeve 40 of the first embodiment, the shank member 240 has a tapered portion 241 in proximity to an external threaded end 225. A washer 230 and the fixation member 250 of the third embodiment are identical with the washer and the fixation member of the first embodiment.

The post-installed anchor 200 of the third embodiment has a sleeve-like structure integrated with the bolt body 220. This structure desirably decreases the total number of parts and decreases the number of assembling steps of the post-installed anchor 200. The non-use of a separate sleeve results in eliminating the need for the structure of the expansion end adopted for preventing the sleeve from entering deep inside the expansion end 256 of the fixation member (described above as the modification of the first embodiment with reference to FIGS. 6 and 7). This facilitates production of the fixation member 250. Since the bolt body has the higher structural strength than the sleeve, it is not required to divide the expansion end 256 of the fixation member 250 into multiple expansion pieces. Namely the expansion end of the fixation member may be formed in a simple cylindrical shape. As rotation of the bolt body 220 of the post-installed anchor 200 induces movement of the fixation member 250, the expansion end 256 rides on the tapered portion 241 of the shank member 240 to be cracked and widened and is thereby press fit in and bites into the inner wall of an installation hole 90 like the post-installed anchor 10 of the first embodiment described above. Formation of at least one constriction on an edge of the expansion end 256 is desirable to facilitate cracking of the expansion end 256.

In the post-installed anchor 200 of the third embodiment shown in FIG. 11, the shank member 240 of the bolt body 220 other than the tapered portion 241 has a fixed outer diameter. As long as the shank member 240 has the tapered portion 241 and causes the expansion end 256 of the fixation member 250 to be press fit in and bite into an inner wall of an installation hole, the shank member 240 may have a decreasing outer diameter. This arrangement desirably reduces the total weight of the post-installed anchor 200.

Figure 12:
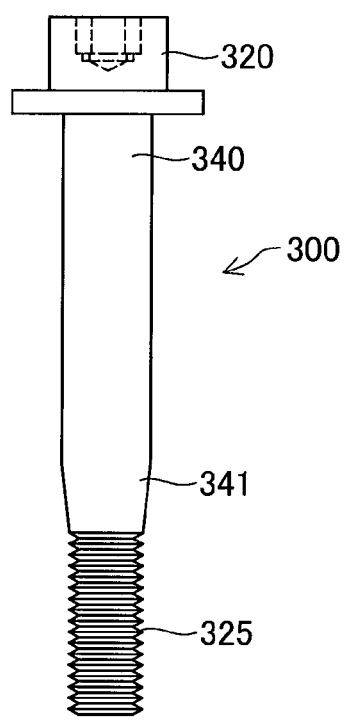
FIG. 12 is an explanatory diagrammatic representation of the structure of a post-installed anchor 300 according to a fourth embodiment.
Figure 12:
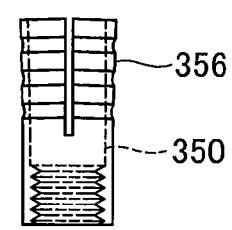

In a post-installed anchor 300 according to a fourth embodiment of the invention shown in FIG. 12, a washer 330 may also be integrated with a bolt body 320. As in the third embodiment, in the post-installed anchor 300 of the fourth embodiment, a shank member 340 functions as a large-diameter member like the sleeve. The post-installed anchor 300 with a fixation member 350 attached thereto is inserted into an installation hole 90. With rotation of a bolt body 320, an expansion end 356 of the fixation member 350 rides on a tapered portion 341 formed on one end of the shank member 340 to be extended outward and is thereby press fit in and bites into an inner wall of an installation hole 90 like the third embodiment. The structure of the fourth embodiment further decreases the total number of parts, while assuring the functions of the post-installed anchor.

The embodiments and their modifications discussed above are to be considered in all aspects as illustrative and not restrictive. There may be many other modifications, changes, and alterations without departing from the scope or spirit of the main characteristics of the present invention. For example, the expansion end may have one, three, or five or more than five slits to be divided into one, three, or five or more than five expansion pieces. In an application with a separate sleeve like the first embodiment, the separate sleeve 40 does not rotate with rotation of a bolt body. A sharp convex may be formed on the edge of the tapered face of the sleeve 40 to bite into the edge of the expansion end 56 and facilitate cracking of the expansion end 56. This arrangement results in eliminating the need for the slits formed in the expansion end.

What we claimed is:

1. A post-installed anchor driven in a pilot hole to be securely fixed, comprising:
    a bolt body structured to have a threaded end;
    a fixation member structured to have a threaded end screwed to the threaded end of the bolt body and an expansion end on a side facing a head of the bolt body; and
    a large-diameter feature formed to have a larger diameter than the threaded end and structured to allow the expansion end of the fixation member to ride on one end of the large-diameter feature with a movement of the fixation member toward the head of the bolt body, which is induced by rotation of the bolt body, wherein:
    the large-diameter feature and the expansion end are both made of metal;
    the expansion end of the fixation member has a cut formed in an axial direction on an edge of the expansion end in proximity to the large-diameter feature;
    the expansion end divided by the cut has a shape widened toward the edge of the expansion end;
    as the bolt body rotates, the expansion end of the fixation member rides on the large-diameter feature and is thereby widened, buckled, and extended outward and bites into an inner wall of the pilot hole to be fixed thereto;
    further comprising a plurality of concavities in an outer surface of the expansion end of the fixation member, the concavities being configured to facilitate the widening and extension outward of the expansion end of the fixation member, and to enhance the fixing to the anchor to the pilot hole.

2. The post-installed anchor in accordance with claim 1, wherein the large-diameter feature is a large-diameter member slidably surrounding the bolt body.

3. The post-installed anchor in accordance with claim 1, wherein an end of the large-diameter feature in proximity to the fixation member forms a tapered face.

4. The post-installed anchor in accordance with claim 1, wherein:
    the large-diameter feature is a sleeve fit on the bolt body, and
    the expansion end of the fixation member rides on an end of the sleeve to be widened and is buckled and extended outward with movement of the fixation member, which is induced by rotation of the bolt body.

5. The post-installed anchor in accordance with claim 4, wherein:
    the sleeve has at least two sleeve members separated in an axial direction, and
    one sleeve member to be arranged in proximity to the fixation member has a tapered face with an outer diameter gradually narrowed in a direction toward the fixation member.

6. The post-installed anchor in accordance with claim 1, wherein:
    the fixation member has at least four cuts, and
    the expansion end is divided into multiple expansion pieces by the at least four cuts to have a shape widened toward the edge of the expansion end.

7. The post-installed anchor in accordance with claim 6, wherein at least one of the multiple expansion pieces of the expansion end divided by the at least four cuts is formed in a shape that prevents an edge of the sleeve in proximity to the fixation member from entering deep inside the expansion end.

8. The post-installed anchor in accordance with claim 1, wherein the expansion end of the fixation member has a longer length in an axial direction than a length of the threaded end of the fixation member screwed to the threaded end of the bolt body.

9. The post-installed anchor in accordance with claim 1, wherein the large-diameter feature is an enlarged portion of the bolt body having a diameter greater than the threaded end of the bolt body.

10. A post-installed anchor driven in a pilot hole to be securely fixed, comprising:
    one bolt body selected out of at least two bolt bodies having different lengths;
    one or multiple sleeves selected out of at least two sleeves having different lengths and fit on the bolt body; and
    a fixation member screwed to a threaded end of the bolt body with the sleeve fit thereon and structured to have an expansion end arranged in proximity to the sleeve, wherein:
    the expansion end and the sleeve in proximity to the expansion end are both made of metal;
    the expansion end of the fixation member has a cut formed in an axial direction on an edge of the expansion end in proximity to the large-diameter member;
    the expansion end divided by the cut has a shape widened toward the edge of the expansion end;
    with a movement of the fixation member toward a head of the bolt body, which is induced by rotation of the bolt body, an edge of the sleeve presses open the expansion end of the fixation member, which is then widened and extended outward, and is buckled toward the head of the bolt body, so that the expansion end is press fit in and bites into an inner wall of the pilot hole to be fixed thereto; and
    further comprising a plurality of concavities in an outer surface of the expansion end of the fixation member, the concavities being configured to facilitate the widening and extension outward of the expansion end of the fixation member, and to enhance the fixing to the anchor to the pilot hole.

11. The post-installed anchor in accordance with claim 10, wherein:
    the fixation member has at least four cuts, and
    the expansion end is divided into multiple expansion pieces by the at least four cuts to have a shape widened toward the edge of the expansion end.

12. The post-installed anchor in accordance with claim 11, wherein at least one of the multiple expansion pieces of the expansion end divided by the at least four cuts is formed in a shape that prevents an edge of the sleeve in proximity to the fixation member from entering deep inside the expansion end.

13. The post-installed anchor in accordance with claim 10, wherein an end of the sleeve in proximity to the fixation member forms a tapered face.

14. The post-installed anchor in accordance with claim 10, wherein the expansion end of the fixation member has a longer length in an axial direction than a length of the threaded end of the fixation member screwed to the threaded end of the bolt body.

\* \* \* \* \*